(12) United States Patent
Nakashima

(10) Patent No.: US 9,678,902 B2
(45) Date of Patent: Jun. 13, 2017

(54) DATA PROCESSING APPARATUS

(71) Applicant: Renesas Electronics Corporation, Kawasaki-shi (JP)

(72) Inventor: Kenichi Nakashima, Kawasaki (JP)

(73) Assignee: Renesas Electronics Corporation, Kawasaki-shi, Kanagawa (JP)

(*) Notice: Subject to any disclaimer, the term of this patent is extended or adjusted under 35 U.S.C. 154(b) by 615 days.

(21) Appl. No.: 14/070,293

(22) Filed: Nov. 1, 2013

(65) Prior Publication Data

US 2014/0201412 A1 Jul. 17, 2014

(30) Foreign Application Priority Data

Jan. 15, 2013 (JP) ................................ 2013-004290

(51) Int. Cl.
G06F 13/26 (2006.01)
G06F 9/48 (2006.01)

(52) U.S. Cl.
CPC ............ G06F 13/26 (2013.01); G06F 9/4812 (2013.01)

(58) Field of Classification Search
CPC ................................ G06F 13/26; G06F 9/4812
See application file for complete search history.

(56) References Cited

U.S. PATENT DOCUMENTS

| | | | | |
|---|---|---|---|---|
| 5,410,708 A * | 4/1995 | Miyamori | ............... | G06F 13/24 710/264 |
| 5,566,352 A * | 10/1996 | Wishneusky | ........... | G06F 13/26 710/260 |
| 5,931,936 A * | 8/1999 | Chung | ................... | G06F 9/4812 710/263 |
| 6,112,274 A | 8/2000 | Goe et al. | | |
| 6,163,829 A * | 12/2000 | Greim | ..................... | G06F 13/24 710/260 |
| 7,822,899 B2 | 10/2010 | Oyama et al. | | |
| 2002/0002668 A1* | 1/2002 | Miura | ................. | G06F 9/30101 712/244 |
| 2002/0116563 A1* | 8/2002 | Lever | ...................... | G06F 13/26 710/260 |
| 2006/0168429 A1* | 7/2006 | Short | .................. | G06F 15/7814 712/228 |

FOREIGN PATENT DOCUMENTS

| | | |
|---|---|---|
| JP | H05-120030 A | 5/1993 |
| JP | H06-202878 A | 7/1994 |
| JP | H08-278937 A | 10/1996 |
| JP | 11-203147 A | 7/1999 |
| JP | 2012-168978 A | 9/2012 |

OTHER PUBLICATIONS

Japanese Office Action dated Jun. 2, 2016 with an English translation thereof.

* cited by examiner

*Primary Examiner* — Nimesh G Patel
(74) *Attorney, Agent, or Firm* — McGinn IP Law Group, PLLC

(57) ABSTRACT

A concurrent flag set (changed from a first state to a second state) when generating a plurality of event signals at the same time from one circuit module that operates synchronously is prepared. When it is determined that the concurrent event signals are generated with reference to the concurrent flag, processing corresponding to the concurrent event signals is executed in order of priority, or requests for ordering or starting the processing are issued in order of priority.

20 Claims, 13 Drawing Sheets

DATA PROCESSING APPARATUS

CROSS-REFERENCE TO RELATED APPLICATIONS

The disclosure of Japanese Patent Application No. 2013-004290 filed on Jan. 15, 2013 including the specification, drawings and abstract is incorporated herein by reference in its entirety.

BACKGROUND

The present invention relates to a control technique for responding to the generation of an event, for example, to an effective technique applied to an interrupt control in a microcomputer.

In a typical interrupt control as the control technique for responding to the generation of an event, when a peripheral circuit generates an event signal, an interrupt controller receives the event signal. The interrupt controller outputs, for example, an interrupt factor responsive to the received event signal to a CPU as vector information, and requests interrupt processing from the CPU according to an interrupt signal. When the interrupt controller receives a plurality of event signals at the same time, the interrupt controller mediates the competing event signals according to an interrupt priority, and requests the interrupt processing higher in the priority from the CPU. In this situation, a difference may occur in a signal delay of a signal propagation path until the plurality of event signals generated at the same time arrives at the interrupt controller. In this situation, when the event signal lower in the interrupt priority is received ahead, the interrupt processing higher in the interrupt priority is postponed. Japanese Unexamined Patent Application Publication No. Hei-11 (1999)-203147 discloses a technique that focuses on such a problem.

In Japanese Unexamined Patent Application Publication No. Hei-11 (1999)-203147, for the plurality of event signals which is sequentially input, an interrupt prioritization of the event signals input every given duration is determined.

SUMMARY

The present inventors have studied disadvantages caused by the transmission delay of the plural event signals. As described above, the event signals different in the priority which are generated at the same time may be sequentially input to the interrupt controller due to the transmission delay. The technique disclosed in Japanese Unexamined Patent Application Publication No. Hei-11 (1999)-203147 can be applied to this case. However, there arises no problem if an arrival time caused by the transmission delay falls within the given duration, but a case in which the arrival time exceeds the given duration cannot be dealt with by the technique of the Japanese Unexamined Patent Application Publication No. Hei-11 (1999)-203147. Delay components include not only a wiring delay but also a delay caused by a signal crosstalk, and there is no guarantee that the transmission delay is held constant. Therefore, from this viewpoint, the given duration needs to be increased with a margin. However, in this case, the event signals that have originally sequentially been generated are erroneously recognized to be also generated at the same time, and mediated in the priority. This leads to a risk that the interrupt processing that is low in the interrupt processing but is to be early executed is postponed. The events represented by the interrupt are generated asynchronously from a circuit module such as an A/D converter circuit. The processing order caused by the event signals generated asymmetrically from the different circuit modules at the same time by chance may not conform to the interrupt prioritization without any problem. On the contrary, if the processing order caused by the event signals generated from one circuit module at the same time does not conform to the interrupt prioritization, there is a risk that a disadvantage occurs in the operation of that circuit module.

The above and other problems and novel features will become apparent from a description of the present specification and the attached drawings.

An outline of typical features of embodiments disclosed in the present application will be described in brief as follows.

That is, a concurrent flag set (changed from a first state to a second state) when generating a plurality of event signals at the same time from one circuit module that operates synchronously is prepared. When the event signal lower in priority among the plurality of event signals likely to be generated at the same time is generated, it is determined whether the concurrent event signals are generated, or not, with reference to the concurrent flag. When it is determined that the event signals are generated at the same time, processing corresponding to the concurrent event signals is executed in order of priority, or requests for ordering or starting the processing are issued in order of priority. It can be determined which is the processing corresponding to the concurrent event signals, for example, with reference to a processing request flag indicating that a processing request has been issued for each of the event signals.

Advantages obtained by the typical features of the embodiments disclosed in the present application will be described in brief as follows.

That is, even if the concurrent event signals have been sequentially received due to the wiring delay or the crosstalk delay, whether those event signals have been generated at the same time, or not, becomes apparent with reference to the concurrent flag. Therefore, a high reliability can be ensured for the processing order corresponding to the event signals generated at the same time from one circuit module to be set to the order of priority, and its realization is facilitated.

DETAILED DESCRIPTION

1. Outline of Embodiment

Figure 1:
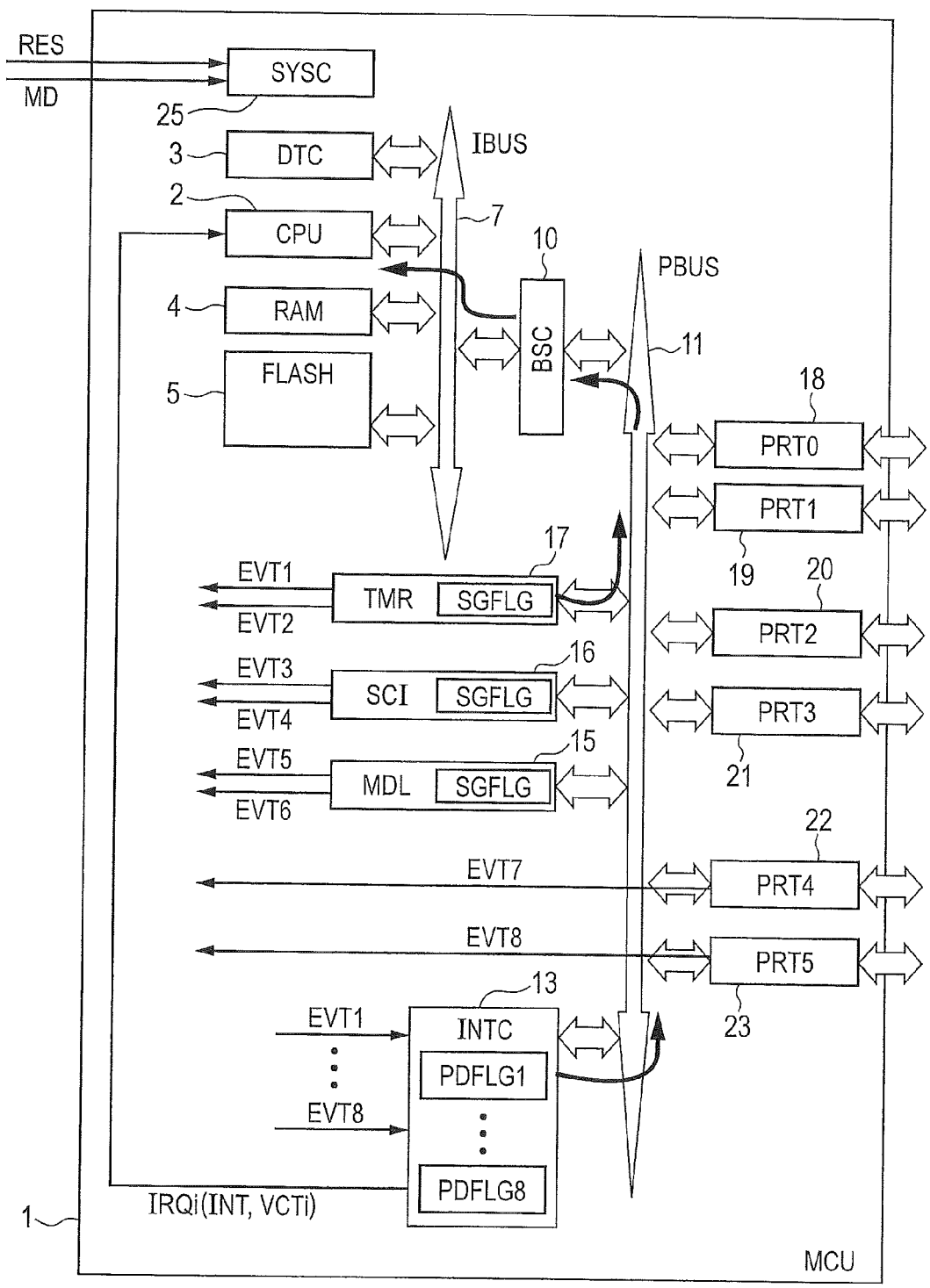
FIG. 1 is a block diagram illustrating a microcomputer as a data processing apparatus according to a first embodiment.

First, a typical embodiment disclosed in the present application will be described. Reference numerals or symbols in the drawings, which are referred to in brackets in the outline description of the typical embodiment merely exemplify concepts of components in the brackets.

[1]<Control Referring to Concurrent Flag Set in Response to Concurrent Events Different in Priority>

A data processing apparatus (1, 1A, 1B) includes a plurality of first circuits (15 to 17, 22, 23) that can generate event signals (EVT1 to EV8), and a second circuit (2, 13A, 6) that controls processing corresponding to the generated event signal when the event signal is generated from the first circuit. The first circuit has a concurrent flag (SGFLG) which is set in a set state when a plurality of given event signals (IVT1, EVT2) different in the priority of processing is generated at the same time. When the first circuit generates the given event signal, the second circuit refers to the concurrent flag of the circuit module pertaining to a request source thereof, and controls processing corresponding to the given event signal and processing corresponding to another event signal generated together with the given event signal to be set in order of priority when the concurrent flag is in the set state.

According to the above configuration, even if the concurrent event signals have been sequentially received due to the wiring delay or the crosstalk delay, whether those event signals have been generated at the same time, or not, can be determined with reference to the concurrent flag of the first circuit pertaining to the requested interrupt factor. The event signals generated from the different first circuits at the same time by chance, and the event signals generated from the same first circuit at different timings can be surely distinguished from each other. The second circuit executes the processing corresponding to the concurrent event signals in order of priority when it is determined that there are concurrent interrupt requests. Therefore, a high reliability can be ensured for the processing order corresponding to the event signals generated from one first circuit at the same time to be set to the order of priority, and its realization is facilitated.

[2]<Processing Order Control by Central Processing Unit Responsive to Concurrent Events Different in Priority>

The data processing apparatus (1) includes a central processing unit (2) that executes an instruction, a plurality of circuit modules (15 to 17, 22, 23) that can generate the event signals (EVT1 to EVT8), and an interrupt controller (13) that receives processing requests corresponding to the event signals generated from the circuit modules, mediates the processing requests that compete the reception according to a processing order corresponding to the interrupt priority, and requests the central processing unit to conduct the interrupt processing corresponding to the received processing requests. The circuit modules each have the concurrent flag (SGFLG), and changes the concurrent flag from the first state to the second state when generating a plurality of event signals different in the interrupt priority at the same time. When receiving a request for given interrupt processing from the interrupt controller, the central processing unit refers to the concurrent flag of the circuit module pertaining to an interrupt factor of the request, and executes the given interrupt processing and interrupt processing corresponding to another event signal generated together with that event signal in order of priority when the concurrent flag is in the second state. The central processing unit sets the concurrent flag to the first state after referring to the concurrent flag.

According to the above configuration, even if the concurrent event signals have been sequentially received by the interrupt controller due to the wiring delay or the crosstalk delay, the central processing unit that has received the interrupt request can determine whether those event signals have been generated at the same time, or not, with reference to the concurrent flag of the circuit modules pertaining to the requested interrupt factor. The event signals generated from the different circuit modules at the same time by chance, and the event signals generated from the same circuit module at different timings can be surely distinguished from each other. The central processing unit executes the interrupt processing corresponding to the concurrent event signals in order of priority, for example, with reference to internal information of the interrupt controller, when the central processing unit determines that there are the concurrent interrupt requests. Therefore, a high reliability can be ensured for the processing order corresponding to the event signals generated from one circuit module at the same time to be set to the order of priority, and its realization is also facilitated.

[3]<Processing Request Flag Reference>

In the above item 2, the interrupt controller has the processing request flags (PDFLG1 to PDFLG8) indicative of whether the processing request is present, or not, for each of the event signals. The central processing unit refers to the processing request flag as the internal information to determine whether the interrupt processing corresponding to the concurrent event signal is unprocessed, or not, and clears the corresponding processing request flag in a no-request state after the completion of the interrupt processing.

According to the above configuration, the central processing unit can easily determine another interrupt processing corresponding to the concurrent event signal with reference to the processing request flag, and execute the interrupt processing corresponding to the concurrent event signal in the order of priority.

[4]<Multiple Interrupt Inhibition>

In the above item 2 or 3, the interrupt controller can inhibit the multiple interrupt.

According to the above configuration, when the multiple interrupt is inhibited for the purpose of preventing adverse effects attributable to the complication of the interrupt processing which is caused by multiple interrupt, the means of the above item 1 is essential. Even if interrupt processing lower in the interrupt priority starts ahead when the multiple interrupt is allowed, an interrupt request higher in the priority than that interrupt processing can be interrupted while the interrupt processing lower in the priority is being conducted. Therefore, the interrupt processing lower in the priority is not completed unless the interrupt processing higher in the priority has been completed. From this viewpoint, even if the interrupt processing lower in the priority among the interrupt processing corresponding to the plurality of concurrent event signals is requested ahead, there arises no problem at the time of completing the interrupt processing. However, when the interrupt processing lower in the priority starts ahead, adverse effects caused by preceding processing during that interrupt processing may not be eliminated. Hence, the means of the above item 2 does not always require the inhibition of the multiple interrupt.

[5]<Synchronization of Circuit Modules and Interrupt Controller with Different Clock Signals>

In any one of the above items 2 to 4, the circuit modules and the interrupt controller operate in synchronization with different clock signals (fp, fc).

According to the above configuration, a signal fetching timing between circuits different in synchronous clock signals from each other is larger in timing deviation is likely to be larger than a signal fetching timing between circuits identical in the synchronous clock signals with each other. Therefore, in this case, the means of the above item 2 is particularly preferable.

[6]<Interrupt Signal and Factor Information>

In any one of the above items 2 to 5, the interrupt controller requests the interrupt processing according to an interrupt signal (INT) and interrupt factor information (VCTi) corresponding to the event signal.

According to the above configuration, the central processing unit can immediately respond to an interrupt request.

[7]<Sequence Control by Interrupt Controller Responsive to Concurrent Events Different in Priority>

The data processing apparatus (1A) includes a central processing unit (2) that executes an instruction, a plurality of circuit modules (15 to 17, 22, 23) that can generate the event signals (EVT1 to EVT8), and an interrupt controller (13A) that receives processing requests corresponding to the event signals generated from the circuit modules, mediates the processing requests that compete the reception according to a processing order corresponding to the interrupt priority, and requests the central processing unit to conduct the interrupt processing corresponding to the received processing requests. The circuit modules each have the concurrent flag (SGFLG), and changes the concurrent flag from the first state to the second state when generating a plurality of event signals different in the interrupt priority at the same time. When receiving a processing request corresponding to a given event signal from the circuit modules, the interrupt controller refers to the concurrent flag of the circuit module pertaining to a requested processing factor, and requests the interrupt processing that complies with the given processing request, and the interrupt processing that complies with a processing request corresponding to another event signal generated together with that event signal in order of priority when the concurrent flag is in the second state. The interrupt controller sets the concurrent flag to the first state after referring to the concurrent flag.

According to the above configuration, even if the concurrent event signals have been sequentially received by the interrupt controller due to the wiring delay or the crosstalk delay, the interrupt controller that has received the processing request corresponding to the event signal can determine whether those event signals have been generated at the same time, or not, with reference to the concurrent flag of the circuit modules pertaining to the requested processing factor. The event signals generated from the different circuit modules at the same time by chance, and the event signals generated from the same circuit module at different timings can be surely distinguished from each other. The interrupt controller requests the interrupt processing corresponding to the concurrent event signals in order of priority, for example, with reference to internal information pertaining to the reception of the event signals, when the interrupt controller determines that there is an interrupt request corresponding to the concurrent event signal. Therefore, a high reliability can be ensured for the processing order corresponding to the event signals generated from one circuit module at the same time to be set to the order of priority, and its realization is also facilitated.

[8]<Processing Request Flag Reference>

In the above item 7, the interrupt controller has the processing request flags (PDFLG1 to PDFLG8) indicative of whether the processing request is present, or not, for each of the event signals. The interrupt controller refers to the processing request flag to determine whether the interrupt processing corresponding to the concurrent event signal is unprocessed, or not. The central processing unit clears the corresponding processing request flag in a no-request state after the completion of the interrupt processing.

According to the above configuration, the interrupt controller can easily determine another interrupt processing corresponding to the concurrent event signal with reference to the processing request flag, and request the interrupt processing corresponding to the concurrent event signal in the order of priority.

[9]<Multiple Interrupt Inhibition>

In the above item 7 or 8, the interrupt controller can inhibit the multiple interrupt.

According to the above configuration, when the multiple interrupt is inhibited for the purpose of preventing adverse effects attributable to the complication of the interrupt processing which is caused by multiple interrupt, the means of the above item 7 is essential. As with the above item 4, the means of the above item 7 does not always require the inhibition of the multiple interrupt.

[10]<Synchronization of Circuit Modules and Interrupt Controller with Different Clock Signals>

In any one of the above items 7 to 9, the circuit module and the interrupt controller operate in synchronization with the different clock signals (fp, fc).

According to the above configuration, the same effects as those of the above item 5 are obtained.

[11]<Interrupt Signal and Factor Information>

In any one of the above items 7 to 10, the interrupt controller requests the interrupt processing according to the interrupt signal (INT) and the interrupt factor information (VCTi) corresponding to the event signal.

According to the above configuration, the same effects as those of the above item 6 are obtained.

[12]<Sequence Control by Event Link Controller Responsive to Concurrent Events Different in Priority>

The data processing apparatus (1B) includes a central processing unit (2) that executes an instruction, a plurality of circuit modules (15 to 17, 22, 23) that can generate the event signals (EVT1 to EVT8), and an event link controller (6) that receives the event signals generated from the circuit modules, mediates the event signals that compete the reception according to a processing order corresponding to a start priority, and can output a start control signal of the operation to the circuit modules according to the received event signals. The circuit modules each have the concurrent flag (SGFLG), and changes the concurrent flag from the first state to the second state when generating a plurality of event signals different in the start priority at the same time. The event link controller has a rewritable storage circuit (30), and the storage circuit is used for storage of event control information for specifying start control signals (STR1 to STR8) to be output in response to the event signals. When receiving a request for the start processing responsive to a given event signal from the circuit modules, the event link controller refers to the concurrent flag of the circuit modules pertaining to a requested processing factor, and executes an output of the start control signal responsive to the given processing request, and an output of the start control signal responsive to a processing request pertaining to another event signal generated together with the given event signal in order of priority when the concurrent flag is in the second state. The event link controller sets the concurrent flag to the first state after referring to the concurrent flag.

According to the above configuration, even if the concurrent event signals have been sequentially received by the event link controller due to the wiring delay or the crosstalk delay, the event link controller that has received the start request corresponding to the event signal can determine whether those event signals have been generated at the same time, or not, with reference to the concurrent flag of the circuit modules pertaining to the requested start factor. The event signals generated from the different circuit modules at the same time by chance, and the event signals generated from the same circuit module at different timings can be surely distinguished from each other. The event link controller requests the start processing corresponding to the concurrent event signals in order of priority, for example, with reference to internal information pertaining to the reception of the event signals, when the event link controller determines that there is a start request corresponding to the concurrent event signal. Therefore, a high reliability can be ensured for the processing order corresponding to the event signals generated from one circuit module at the same time to be set to the order of priority, and its realization is also facilitated.

[13]<Processing Request Flag Reference>

In the above item 12, the event link controller has the processing request flags (LPDF1 to LPDF8) indicative of whether the processing request is present, or not, for each of the event signals. The event link controller refers to the processing request flag to determine whether the start control signal corresponding to the concurrent event signal is not output, or not. The circuit module that receives the start control signal clears the corresponding processing request flag in a no-request state after the completion of the operation by the start control signal.

According to the above configuration, the event link controller can easily determine the processing request corresponding to another event signal generated at the same time with reference to the processing request flag, and start the processing corresponding to the concurrent event signals in the order of priority.

[14]<Synchronization of Circuit Modules and Event Link Controller with Different Clock Signals>

In the above item 12 or 13, the circuit modules and the event link controller operate in synchronization with the different clock signals (fp, fc).

According to the above configuration, the same effects as those of the above item 5 are obtained.

[15]<Event Control Information>

In any one of the above items 12 to 14, the event control information variably designates a correspondence between the event signals and the circuit modules, and variably designate selectable operation in the circuit modules.

According to the above configuration, when the circuit modules have a plurality of operation modes, the event control information that defines the correspondence between the event signals and the start control signals can be hierarchically formed.

[16]<Processing Order Control by Controller Responsive to the Concurrent Events Different in Priority>

The data processing apparatus (1B) includes a central processing unit (2) that executes an instruction, a plurality of circuit modules (15 to 17, 22, 23) that can generate the event signals (EVT1 to EVT8), and a controller (6) that receives the event signals generated from the circuit modules, mediates the event signals that compete the reception according to a processing order corresponding to the priority of processing, and requests a required circuit module to processing corresponding to the received event signal. The circuit modules each have the concurrent flag (SGFLG), and changes the concurrent flag from the first state to the second state when generating a plurality of event signals different in the priority of the processing at the same time. When receiving a request for the processing responsive to a given event signal from the circuit modules, the controller refers to the concurrent flag of the circuit modules pertaining to a request source, and requests processing corresponding to the given event signal, and processing corresponding to another event signal generated together with the given event signal in order of priority when the concurrent flag is in the second state. The controller sets the concurrent flag to the first state after referring to the concurrent flag.

According to the above configuration, even if the concurrent event signals have been sequentially received by the controller due to the wiring delay or the crosstalk delay, the controller that has received the processing request corresponding to the event signal can determine whether those event signals have been generated at the same time, or not, with reference to the concurrent flag of the circuit modules pertaining to the requested processing factor. The event signals generated from the different circuit modules at the same time by chance, and the event signals generated from the same circuit module at different timings can be surely distinguished from each other. The controller requests the processing corresponding to the concurrent event signals in order of priority, for example, with reference to internal information pertaining to the reception of the event signals, when the controller determines that there is a processing request corresponding to the concurrent event signal. Therefore, a high reliability can be ensured for the processing order corresponding to the event signals generated from one circuit module at the same time to be set to the order of priority, and its realization is also facilitated.

[17]<Processing Request Flag Reference>

In the above item 16, the controller has the processing request flags (LPDF1 to LPDF8) indicative of whether the processing request is present, or not, for each of the event signals. The controller refers to the processing request flag to determine whether the processing requested in correspondence with the concurrent event signals is unprocessed, or not. The circuit module that receives a request for the processing corresponding to the event signals clears the corresponding processing request flag in a no-request state after the completion of the requested processing.

According to the above configuration, the controller can easily determine the processing request corresponding to another event signal generated at the same time with reference to the processing request flag, and request the processing corresponding to the concurrent event signals in the order of priority.

[18]<Synchronization of Circuit Modules and Controller with Different Clock Signals>

In the above item 16 or 17, the circuit modules and the controller operate in synchronization with the different clock signals (fp, fc).

According to the above configuration, the same effects as those of the above item 5 are obtained.

In the above respective items, a case in which the plurality of event signals different in the priority is generated from one circuit module has been roughly described. A scope of "one circuit module" is not particularly limited, and encompasses a case in which the plurality of circuit modules generates the event signals or the interrupt requests, which are different in the priority, substantially at the same time, in response to a specific event. The same is also applied to the following detailed description.

2. Detailed Description

Embodiments will be described in more detail.

First Embodiment

FIG. 1 illustrates a microcomputer 1 as a data processing apparatus according to a first embodiment. The microcomputer 1 illustrated in the figure is not particularly limited, but formed on one semiconductor substrate made of monocrystal silicon through a CMOS integrated circuit manufacturing technique.

The microcomputer (MCU) 1 includes a central processing unit (CPU) 2 that executes an instruction, a data transfer controller (DTC) 3 that controls data transfer, a RAM 4, and a flash memory (FLASH) 5. Although not limited, those circuits are connected commonly to an internal bus (IBUS) 7, and the internal bus 7 is connected to a peripheral bus (PBUS) 11 through a bus state controller (BSC) 10. The peripheral bus 11 is connected with an interrupt controller (INTC) 13, a timer (TMR) 17, a serial communication interface circuit (SCI) 16, I/O ports (PRT0 to PRT5) 18 to 23, and the other circuit (MDL) 15. The other circuit 15 may be configured by an A/D converter that converts an analog signal into a digital signal, or a D/A converter (D/A) that converts the digital signal into the analog signal. A system controller (STSC) 25 receives a reset signal RES or a mode signal MD to determine an operation mode of the microcomputer 1. The RAM 4 has a work area of the CPU 2, and the flash memory 5 holds programs and data of the CPU 2 in a rewritable manner.

In this example, the TMR 17, the SCI 16, the MDL 15, and the I/O ports 22, 23 are representative of the circuit modules that output the event signals according to the occurrence of events such as the operating state or the internal state. In this example, the event signals are typically exemplified by EVT1 to EVT8. The respective event signals EVT1 to EVT8 are activated when predetermined events are generated, individually. The respective event signals EVT1 to EVT8 are activated asynchronously, individually. Parts of event signals output from the same circuit module may be generated (activated) at the same time. In this example, event signals EVT1 and EVT2 are exemplified as the event signals likely to be generated at the same time.

The event signals EVT1 to EVT8 are supplied to the interrupt controller 13. The interrupt controller 13 receives the activated and input event signals, mediates the received and input event signals according to early or late timing of the reception or the interrupt priority corresponding to the event signals, and conducts an interrupt requirement IRQi on the CPU 2 in response to the event signal that has been received earlier and higher in the interrupt priority. In the interrupt requirement, the interrupt controller 13 inhibits the multiple interrupt although not particularly limited. Alternatively, the system controller 25 selectively inhibits the multiple interrupt according to an operation mode designated by a mode signal MD.

In more detail, the interrupt controller 13 has processing request flags PDFLG1 to PDFLG8 indicating that the processing request has been received for each of the event signals EVT1 to EVT8, and having the corresponding interrupt priority defined. For example, when the interrupt controller 13 receives the activated event signals EVT1 and EVT2, the interrupt controller 13 sets the corresponding processing request flags PDFLG1 and PDFLG2 in synchronization with the operating clocks. The interrupt controller 13 determines the flag highest in the interrupt priority among the set processing request flags, activates an interrupt signal INT together with a vector number VCTi corresponding to that flag, and requests the CPU 2 on the interrupt. If there is an interrupt request IRQi (INT, VCTi), the CPU 2 completes a halfway instruction execution to conduct evacuation operation, and thereafter branches to processing of a program address designated with the use of the vector number VCTi. Although not particularly limited, flag numbers of the processing request flags PDFLG1 to PDFLG8 are set as the vector numbers, and the CPU 2 that has received the vector number adds the vector number to a given base address (head address of a vector address table) as an offset address, and reads the vector address table by the added address to acquire a vector address (program address designated with the use of the vector number VCTi).

The processing request flags PDFLG1 to PDFLG8 can be accessed by the CPU 2. Therefore, the CPU 2 reads processing request flags PDFLG1 to PDFLG8 according to the operation program, and not only can know whether the event has been generated, or not, from the read flag, but also can associate the processing flag in which the event has been generated with a source of the corresponding event signal, a type of the event signal, a corresponding interrupt priority, and the vector number.

The processing request flags PDFLG1 to PDFLG8 brought in the set state are cleared by the CPU 2 by completing the corresponding interrupt processing by the CPU 2.

Figure 2:
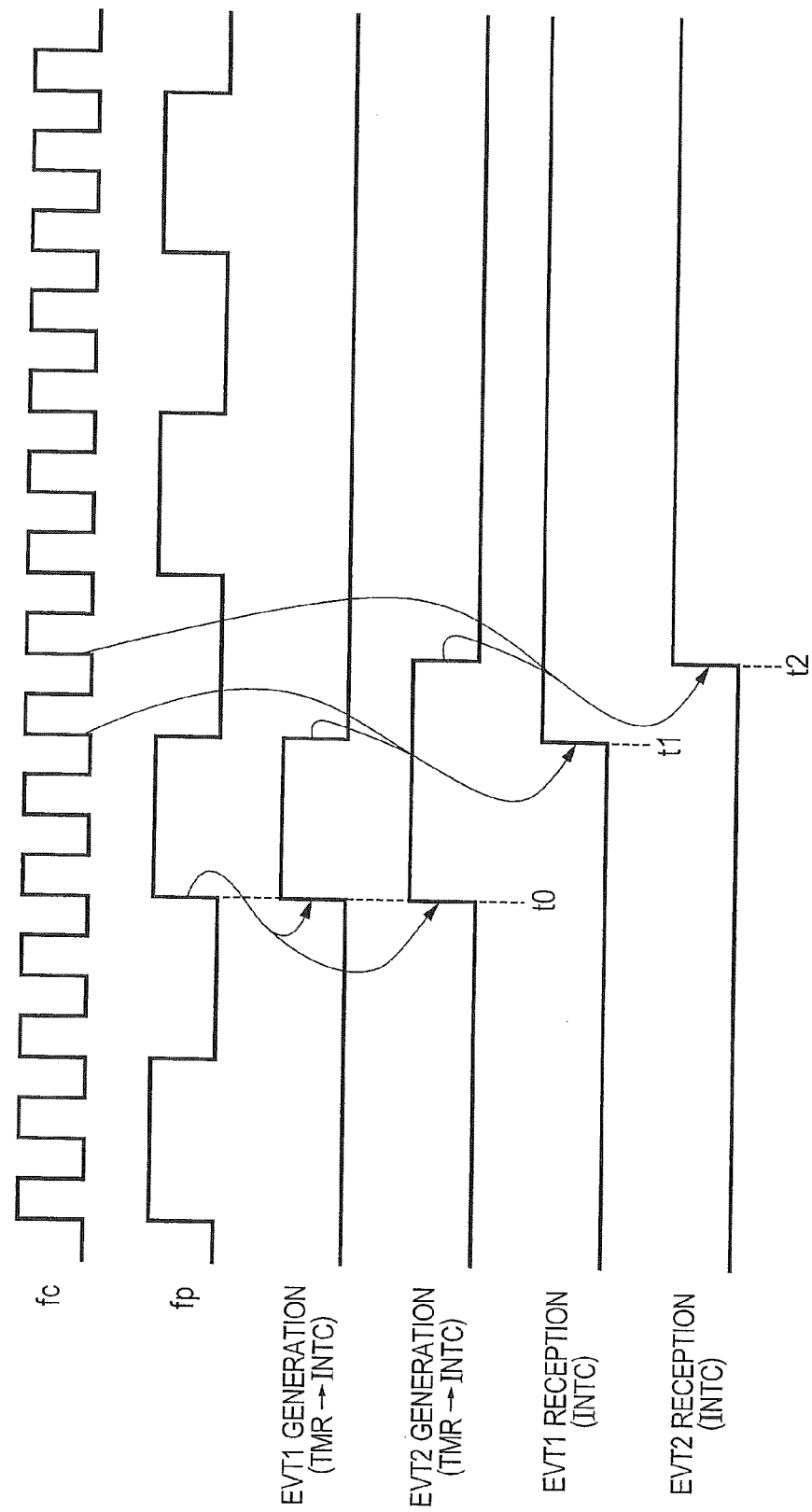
FIG. 2 is a timing chart illustrating a case in which when concurrent event signals are sequentially received by an interrupt controller due to a wiring delay or a crosstalk delay, an interrupt controller receives the event signal higher in priority ahead.
Figure 3:
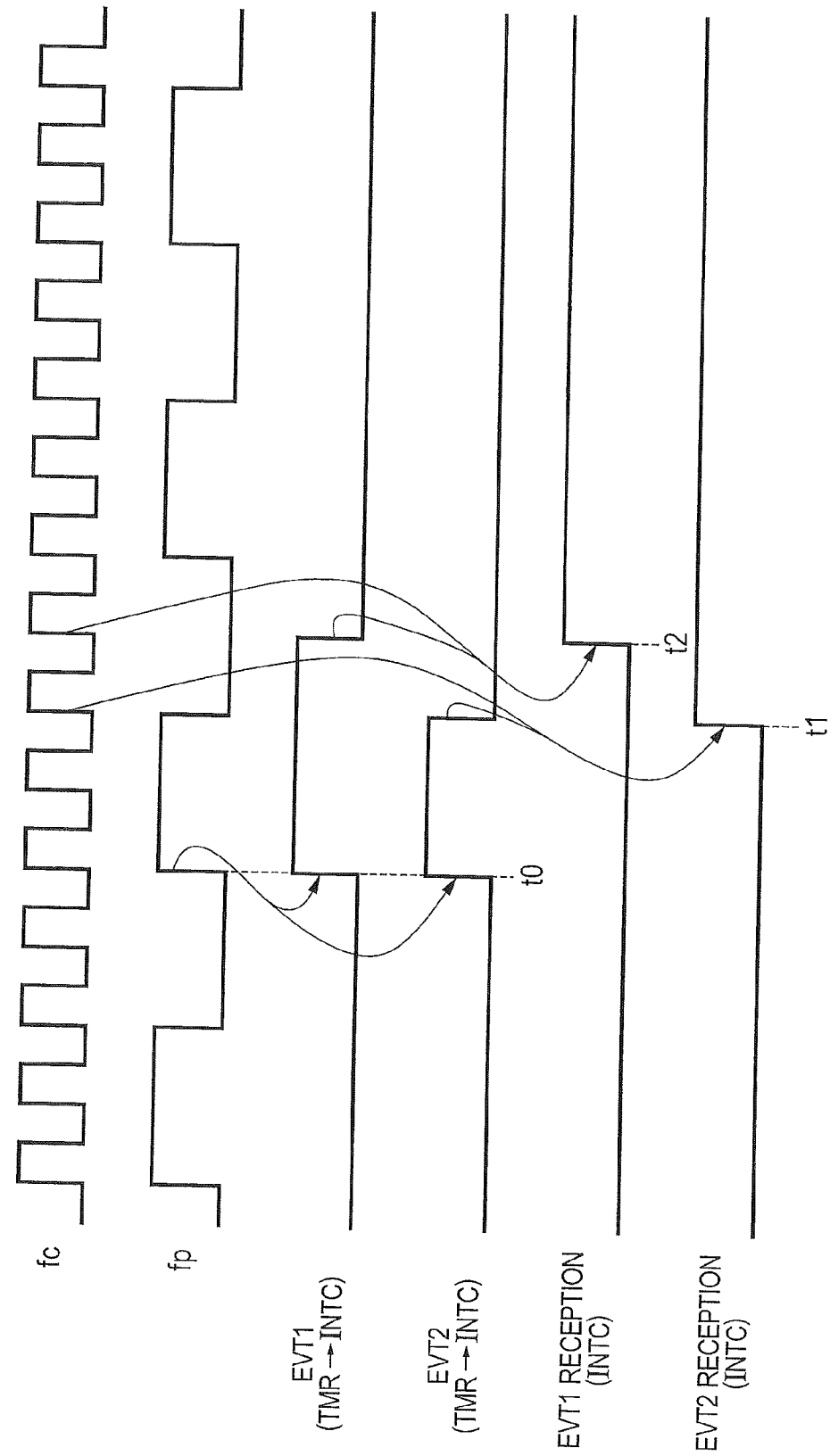
FIG. 3 is a timing chart illustrating a case in which when the concurrent event signals are sequentially received by the interrupt controller due to the wiring delay or the crosstalk delay, the interrupt controller receives the event signal lower in priority ahead.

In this example, the concurrent event signal may be sequentially received by the wiring delay or the crosstalk delay. For example, as exemplified in FIG. 2, when the event signals EVT1 and EVT2 are activated and output from the TMR 17 at the same time at a time t0, if a transmission delay of the event signal EVT2 is large, the interrupt controller receives the event signal EVT1 at a time t1, and thereafter receives the event signal EVT2 at a time t2. Although not particularly limited, the TMR 17 operates in synchronization with a clock signal fp output from a clock pulse generator (CPG) not shown, and the CPU 2 and the interrupt controller 13 operate in synchronization with a clock signal fc output from the clock pulse generator (CPG) not shown. As exemplified in FIG. 3, conversely, if the transmission delay of the event signal EVT1 is large, the interrupt controller receives the event signal EVT2 at the time t1, and thereafter receives the event signal EVT1 at the time t2. The different event signals output from the same circuit module at the same time are originally scheduled to be subjected to the interrupt processing in a corresponding interrupt priority order. Therefore, as illustrated in FIG. 3, even if the reception of the event signal EVT1 higher in the interrupt priority is later than the reception of the event signal EVT2 lower in the interrupt priority, there is a need to ensure that the interrupt processing corresponding to the event signal EVT1 higher in the priority is executed ahead. Means for ensuring this operation will be described in detail below.

Figure 4:
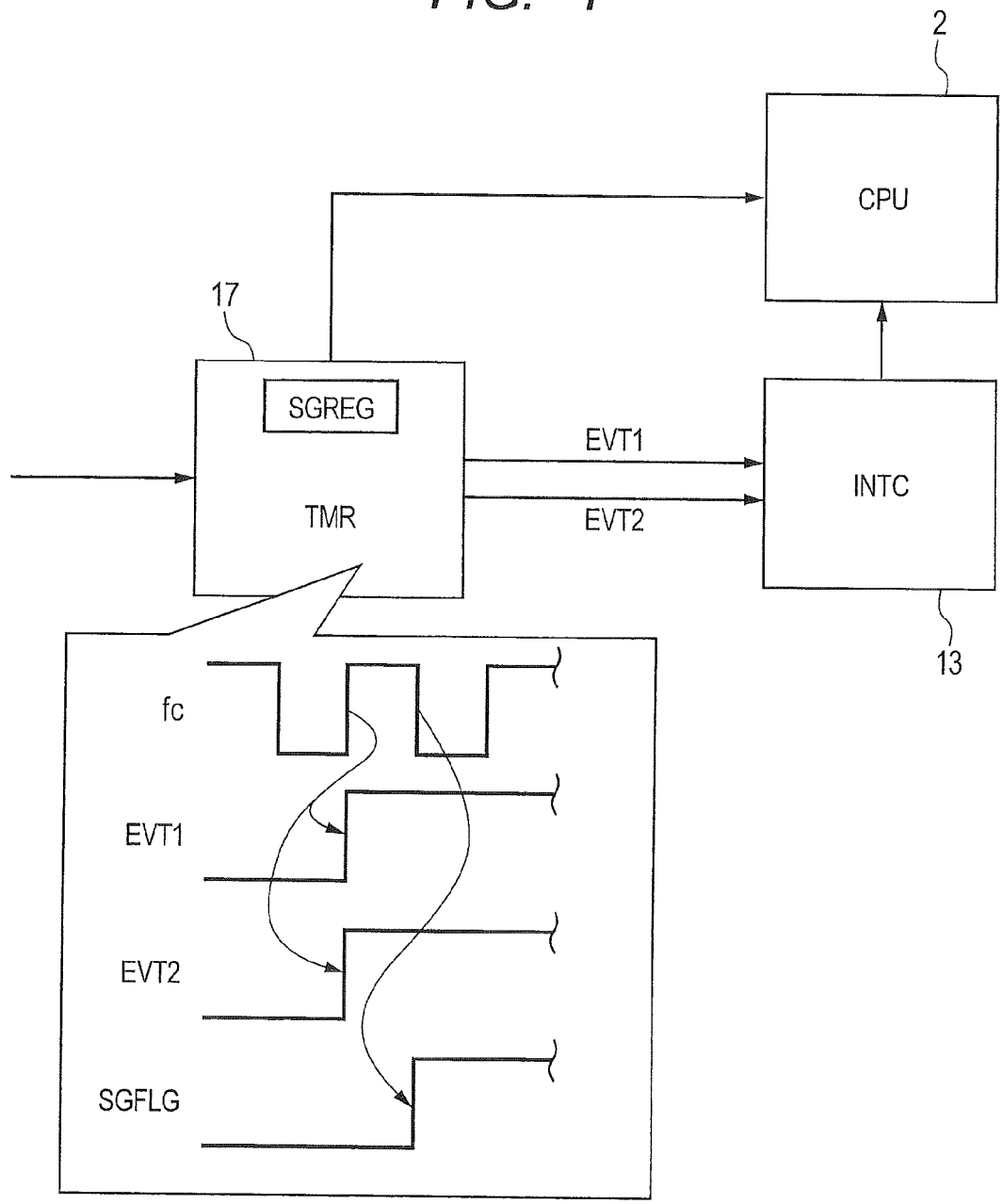
FIG. 4 is an illustrative view illustrating a set timing of a concurrent flag SGFLG.

The circuit modules likely to generate the plurality of event signals different in the interrupt priority at the same time, for example, the TMR 17, the SCI 16, and the MDL 15 each have the concurrent flag SGFLG. In the example of FIG. 1, only a pair of event signals that can be generated in each circuit module at the same time is illustrated. However, the concurrent flag SGFLG is disposed for each of event signal groups likely to be generated at the same time. For example, as exemplified in FIG. 4, when the TMR 17 having the concurrent flag SGFLG generates the plurality of event signals EVT1 and EVT2 different in the interrupt priority in synchronization with a rising edge of the clock signal fp at the same time, the TMR 17 changes the concurrent flag SFGLG from a first state to a second state, for example, from a clear state of a logical value 0 to a set state of the logical value 1.

When receiving a given interrupt request IRQi from the interrupt controller 13, the CPU 2 refers to the concurrent flag SGFLG of the circuit module pertaining to the requested interrupt factor. The CPU 2 determines the interrupt factor according to the vector number VCTi, to thereby read the concurrent flag SGFLG from the circuit module pertaining to the interrupt factor. Unless the concurrent flag is not in the set state, the CPU 2 executes the interrupt processing responsive to the interrupt request IRQi. Heavy arrows in FIG. 1 schematically denote reference paths of the concurrent flag SGFLG and the processing request flags PDFLG1 to PDFLG8.

In this example, the given interrupt request represents an interrupt request requested in response to the event signal lowest in the interrupt priority among the event signals different in the interrupt priority from each other which are likely to be generated from the same circuit module at the same time. In the example of the TMR in FIG. 1, the given interrupt request represents the interrupt request EVT2 corresponding to the event signal EVT2 lower in the corresponding interrupt priority between the event signals EVT1 and EVT2 likely to be generated at the same time. The interrupt request lowest in the interrupt priority is determined according to a system configuration or a system specification for each of the event signal groups likely to be generated at the same time by itself. For example, it can be determined whether such an interrupt request is present, or not, at a head of an interrupt processing program of the CPU 2. Therefore, the concurrent flag SGFLG is referred to only when there is a possibility that a state of FIG. 3 is generated.

When referring to the concurrent flag SGFLG, if the concurrent flag SGFLG is in the set state, the CPU 2 further refers to a processing request flag PDFLGi corresponding to the circuit module pertaining to the interrupt factor, and a processing request flag PDFLGj corresponding to another event signal generated together with this event signal from the interrupt controller 13. Since the interrupt factor is found from the vector number VCTi as in the above description, a location of the processing request flag corresponding to one of the concurrent event signals is found, and a location of the processing request flag corresponding to another of the concurrent event signals is found according to a correspondence relationship between the processing request flag and the event signals. This correspondence relationship may be described in an operating program of the CPU 2, or may be prepared in the flash memory 5 as a correspondence table. The CPU 2 determines whether the processing request flag of the interrupt corresponding to another event signal generated together with the interrupt request IRQi, which is made higher in the interrupt priority than the interrupt request IRQi, is set in the set state, or not, on the basis of the plurality of read processing request flags. That is, it is determined whether the interrupt processing higher in the interrupt priority among the interrupt processing requested by the plurality of concurrent event signals has not been completed, or not.

If the determination result is the completion, the CPU 2 executes the interrupt processing corresponding to the current interrupt request INTi as it is.

If the determination result is not the completion, the CPU 2 defers the execution of the interrupt processing corresponding to the current interrupt request INTi, and executes the concurrent interrupt processing which is higher in the interrupt priority than the deferred processing ahead. The interrupt processing to be executed ahead may use the vector specified in association with the processing request flag PDFLGj that has been already referred to.

A case in which the number of concurrent event signals is three or more is the same as the case of two concurrent event signals. In short, if there is an interrupt request other than the interrupt requests highest in the interrupt priority among those interrupt requests, the CPU 2 refers to the concurrent flag SGFLG of the interrupt request source, and refers to the request flag of the concurrent event signals pertaining to the interrupt requests if the concurrent flag SGFLG is set. The CPU 2 determines whether the concurrent interrupt request of the highest priority has been executed, or not, with the use of the referred results, and executes the interrupt request of the highest priority if the interrupt request of the highest priority is not executed. If the interrupt request of the highest priority has been executed, or is executed, the CPU 2 determines whether the interrupt request has been executed, or not, under the condition in which the concurrent interrupt request that is second highest in the priority is not the current interrupt request. If the interrupt request has been executed, or is executed, the CPU 2 executes the processing pertaining to the current interrupt request. If the concurrent interrupt request which is next highest in the priority is the current interrupt request, the CPU 2 may execute the processing pertaining to the current interrupt request.

The concurrent flag SGFLG referred to in the above processing is cleared by the CPU 2 after the reference processing. Also, the request flag corresponding to the event signals that have been subjected to the interrupt processing before the current interrupt processing in the interrupt priority order in the above sequence of processing is cleared by the CPU 2 when the interrupt processing has been completely executed.

The interrupt processing operation attributable to the event signals EVT1 and EVT2 generated from the TMR 17 at the same time will be described with reference to FIGS. 5 to 8.

Figure 5:
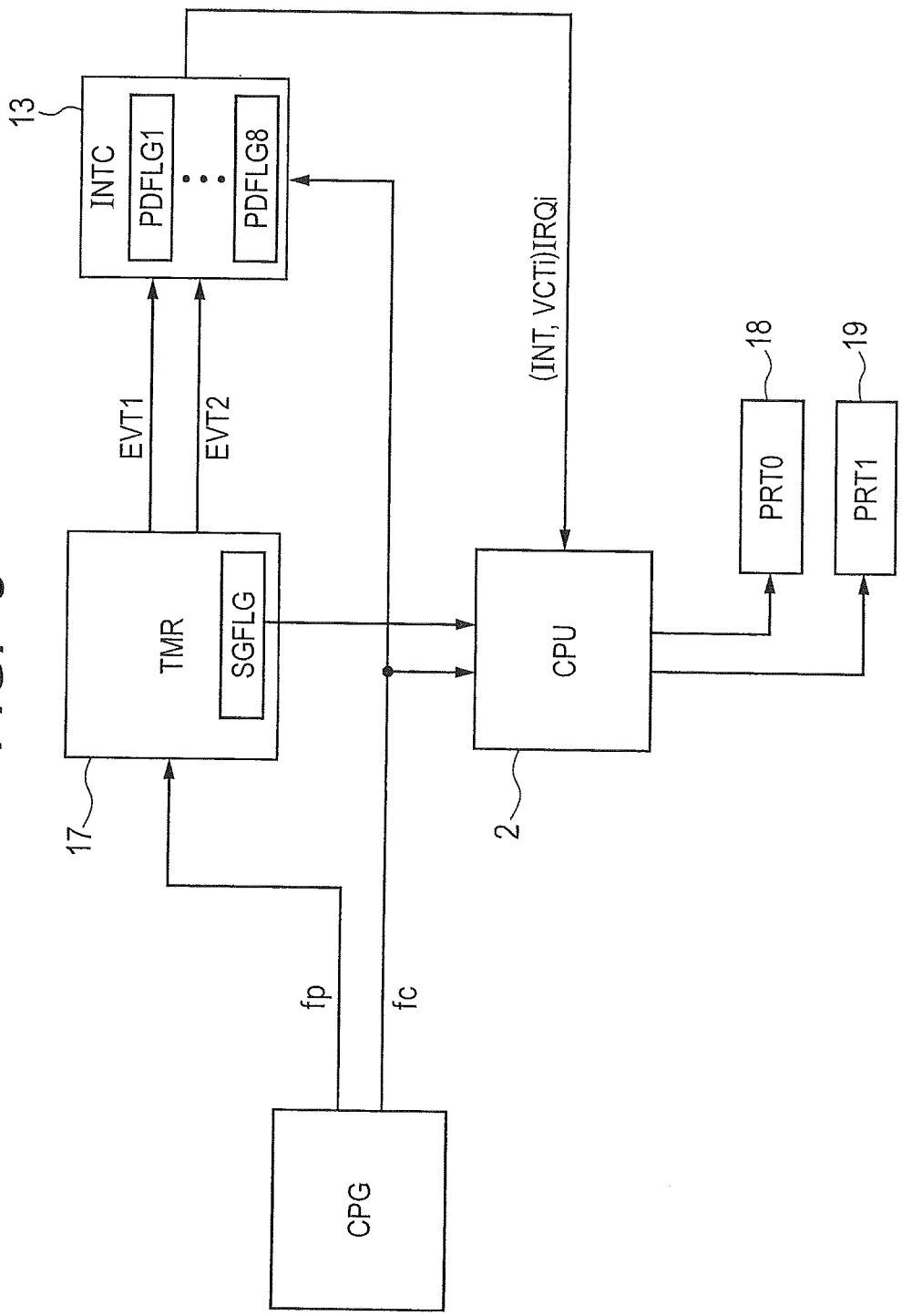
FIG. 5 is a block diagram typically illustrating a main circuit portion related to interrupt processing operation attributable to the event signals generated from a timer at the same time.

FIG. 5 typically illustrates a main circuit portion related to interrupt processing operation attributable to the event signals EVT1 and EVT2 generated from the TMR 17 at the same time. In this example, it is assumed that the interrupt priority corresponding to the event signal EVT1 is higher than the interrupt priority corresponding to the event signal EVT2.

Figure 6:
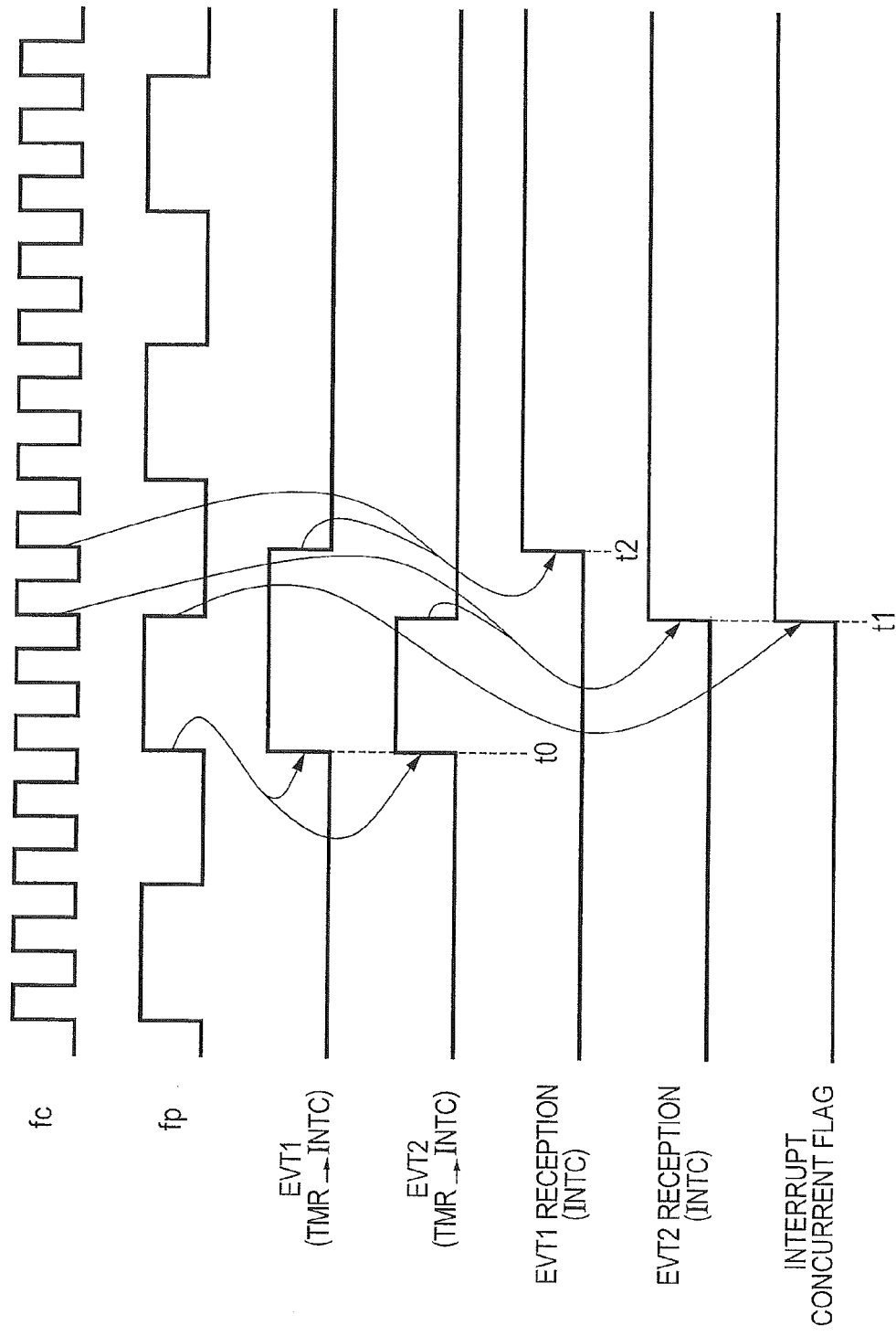
FIG. 6 is a timing chart illustrating an operation timing of the circuit illustrated in FIG. 5.
Figure 7:
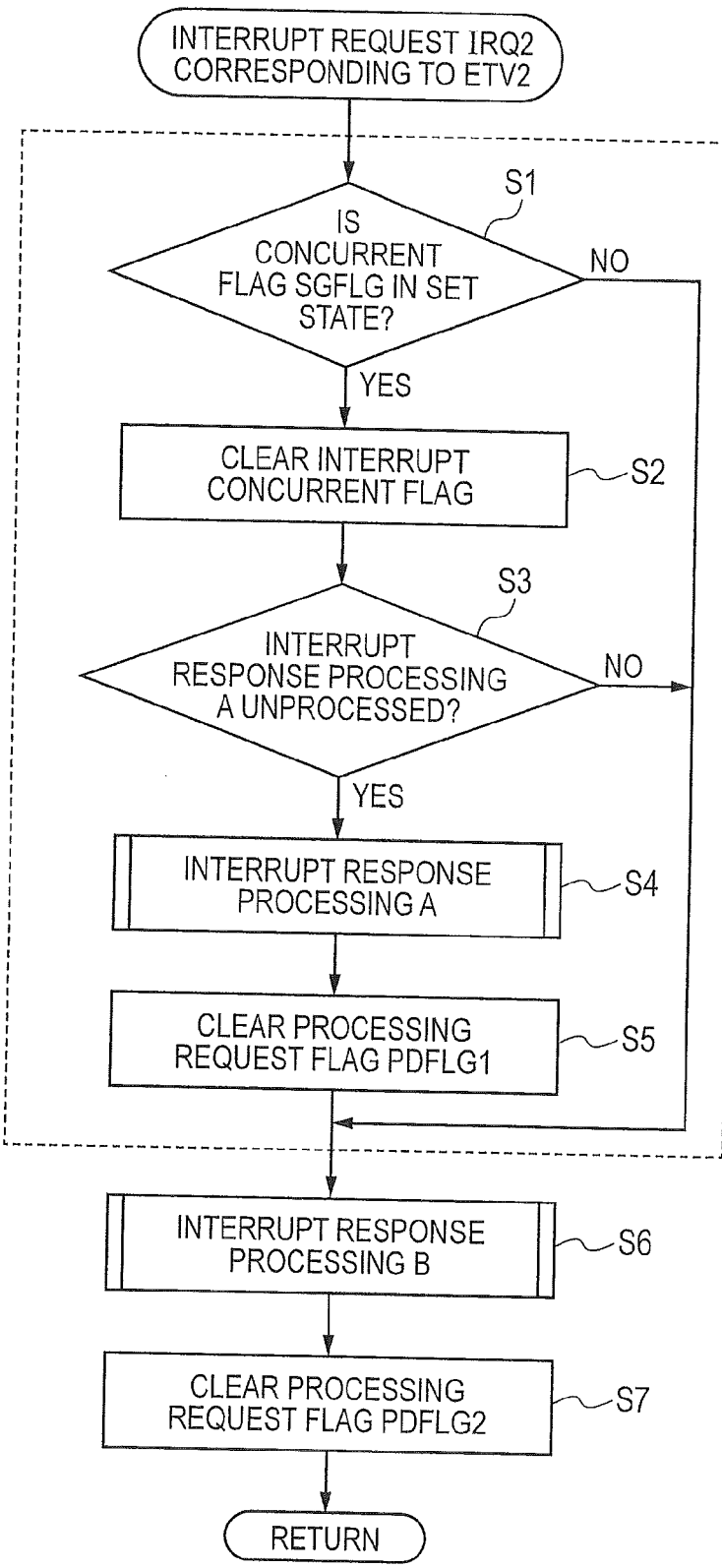
FIG. 7 is a flowchart illustrating processing of a CPU responsive to an interrupt request lower in the priority corresponding to the event signals that can be generated at the same time.

As exemplified in a timing chart of FIG. 6, when the TMR generates the event signals EVT1 and EVT2 in synchronization with a rising edge of the clock signal fp at the same time (time t0), the TMR 17 sets the concurrent flag SGFLG in synchronization with a next falling edge of the clock signal fp (time t1).

The interrupt controller 13 receives the event signal EVT2 lower in the priority ahead (time t1), and thereafter receives the event signal EVT1 higher in the priority (time t2) due to a difference in a wiring delay between the transmission paths of both the event signals EVT1 and EVT2.

The interrupt controller 13 sets the processing request flags PDFLG1 to PDFLG8 in the reception order, and outputs the interrupt request IRQ2 (INT, VCT2) corresponding to the processing request flag PDFLG2 set ahead, which is lower in the interrupt priority, to the CPU 2.

The CPU 2 executes processing responsive to the interrupt request IRQ2. The interrupt processing procedure is exemplified in FIG. 7. The CPU 2 does not immediately start processing (interrupt response processing B) directly responsive to the event signal EVT2 when receiving the interrupt request IRQ2. First, the CPU 2 determines whether the event signal EVT1 has been also generated at the same time, or not, with reference to the concurrent flag SGFLG of the TMR (S1). Since there is no concurrence of the event signal EVT1 higher in the priority if the concurrent flag SGFLG is in a cleared state, the CPU 2 may execute the interrupt response processing B in response to the current interrupt request IRQ2 (S6).

If the concurrent flag SGFLG is in the set state, the CPU 2 first clears the concurrent flag SGFLG (S2), and determines whether the processing (interrupt response processing A) directly responsive to the interrupt request IRQ1 (INT, VCT1) corresponding to the concurrent event signal EVT1, which is higher in the interrupt priority, has been executed, or not (S3). In this determination, the CPU 2 may conduct the determination according to whether the processing request flag PDFLG1 is in the cleared state, or not, with reference to the processing request flag PDFLG1 corresponding to the event signal EVT1. If the interrupt response processing A higher in the priority has been already executed, the flow may proceed to the processing of Step S6.

If the interrupt response processing A has not yet been executed, the CPU 2 executes this interrupt response processing A (S4), and after execution of the interrupt response processing A, the CPU 2 clears the corresponding processing request flag PDFLG1 (S5). Thereafter, the CPU 2 executes the interrupt response processing B responsive to the current interrupt request IRQ2 (INT, VCT2) (S6), and clears the corresponding processing request flag PDFLG2 after execution of the interrupt response processing B (S7).

Figure 8:
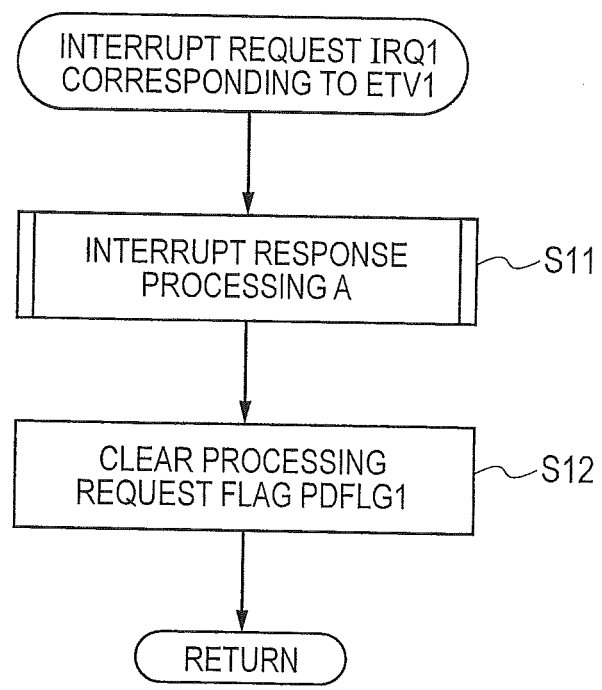
FIG. 8 is a flowchart illustrating processing of a CPU responsive to an interrupt request highest in the priority corresponding to the event signals that can be generated at the same time.

If the interrupt request IRQ (INT, VCT1) responsive to the event signal EVT1 that can be generated at the same time, which is higher in the priority, is generated, the CPU 2 executes the interrupt response processing A responsive to the interrupt request IRQ (INT, VCT1), which is higher in the priority (S11), as exemplified in FIG. 8. After execution of the interrupt response processing A, the CPU 2 clears the corresponding processing request flag PDFLG1 (S12).

As a more specific applied example, a processing example in which a second detection event and a minute detection event in a clock timer are generated at the same time will be described also with reference to FIG. 9. For example, it is assumed that, in FIG. 5, the event signal EVT1 is the second detection event, the event signal EVT2 is the minute detection event, the interrupt request IRQ1 (INT, VCT1) requested in response to the event signal EVT1 is a second progressive interrupt request, and the interrupt request IRQ2 (INT, VCT1) requested in response to the event signal EVT2 is a minute progressive interrupt request. It is assumed that the port (PRT0) 18 is an output port of the second progressive signal to a clock circuit, and the port (PRT1) 19 is an output port of the second progressive signal to the clock circuit. In this way, the second progressive interrupt request IRQ1 is higher in the interrupt priority than the minute progressive interrupt request. The reason will be described with reference to FIG. 9.

Figure 9:
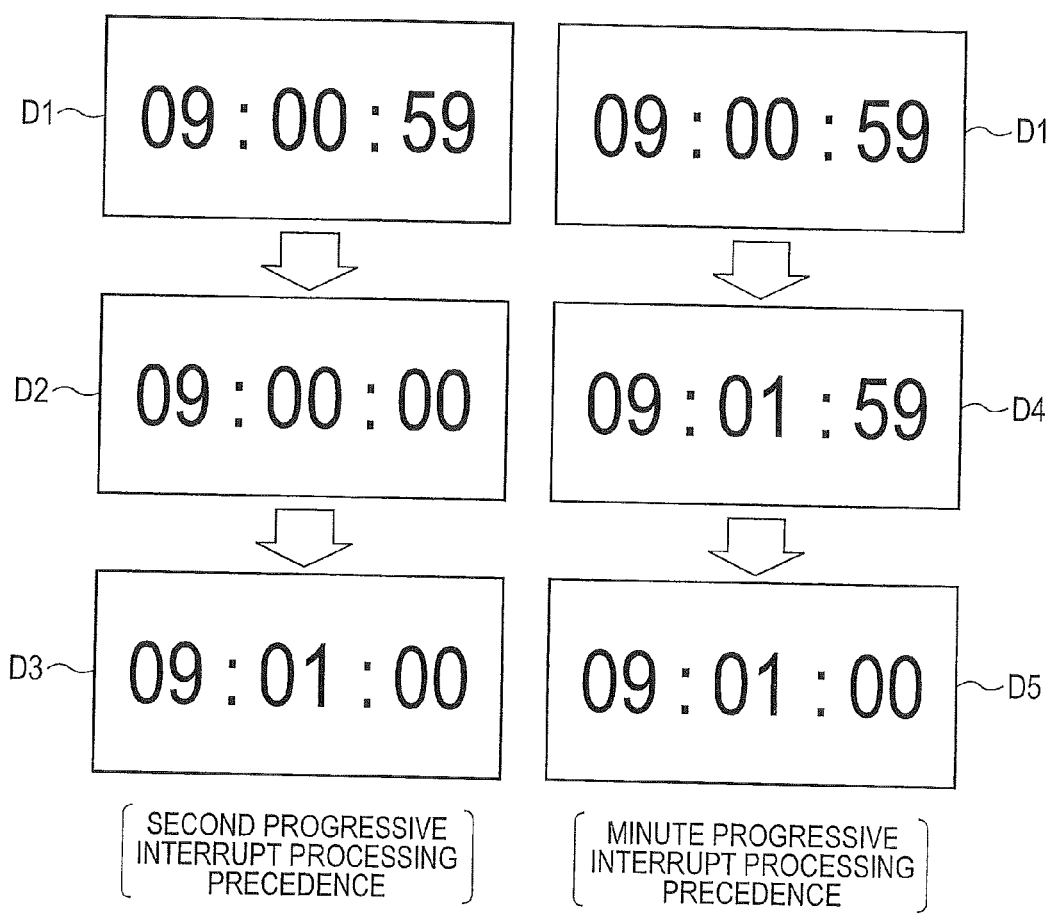
FIG. 9 is an illustrative view illustrating a display state when a second detection event and a minute detection event are generated at the same time, and a second progressive interrupt request is preceded, and a display state when a minute progressive interrupt request is preceded.

FIG. 9 illustrates a display example in which the second detection event EVT1 and the minute detection event EVT2 are generated at the same time, a second display is changed from "59" to "00", and a minute display is incremented by +1. Display states D1, D2, and D3 show display examples as expected, and display states D1, D4, and D5 show anticlimactic display examples. When the second detection event EVT1 and the minute detection event EVT2 are generated at the same time in the display state D1, the display state D2 shows a state in which the second progressive interrupt processing has been executed ahead, and the display state D3 shows a state in which the minute progressive interrupt processing has been subsequently executed. This display sequence is identical with or similar to the display order when the leap second is inserted (09:00:60), and coincides with the processing normally conducted. On the contrary, when the second detection event EVT1 and the minute detection event EVT2 are generated at the same time in the display state D1, the display state D4 shows a state in which the minute progressive interrupt processing has been executed ahead, and the display state D5 shows a state in which the second progressive interrupt processing has been subsequently executed. This display sequence is a display order that cannot be applied with the inclusion of the leap second insertion. Therefore, if the above embodiment is applied to this time display, when the second detection event EVT1 and the minute detection event EVT2 are generated at the same time, even if the generation of the minute detection event is received ahead, and the minute progressive interrupt request IRQ2 is requested by the CPU 2 ahead, the second progressive interrupt processing is executed ahead, and the display sequence represented by D1, D2, and D3 can be ensured.

The applied example of FIG. 9 is also applied to a case in which the time display is conducted as a time stamp.

According to the first embodiment, even if the concurrent event signals EVT1 and EVT2 have been sequentially received by the interrupt controller 13 due to the wiring delay or the crosstalk delay, the CPU 2 that has received the request for the interrupt can determine whether those event signals have been generated at the same time, or not, with reference to the concurrent flag SGFLG of the circuit module pertaining to the requested interrupt factor. The event signals generated from the different circuit modules at the same time by chance, and the event signals generated from the same circuit module at different timings can be surely distinguished from each other. The central processing unit 2 executes the interrupt processing corresponding to the concurrent event signals in order of priority, for example, with reference to the processing request flag PDFLGi of the interrupt controller 13, when the central processing unit 2 determines that there are the concurrent interrupt requests. Therefore, the high reliability can be ensured for the processing order corresponding to the event signals generated from one circuit module at the same time to be set to the order of priority, and its realization is facilitated.

Second Embodiment

Figure 10:
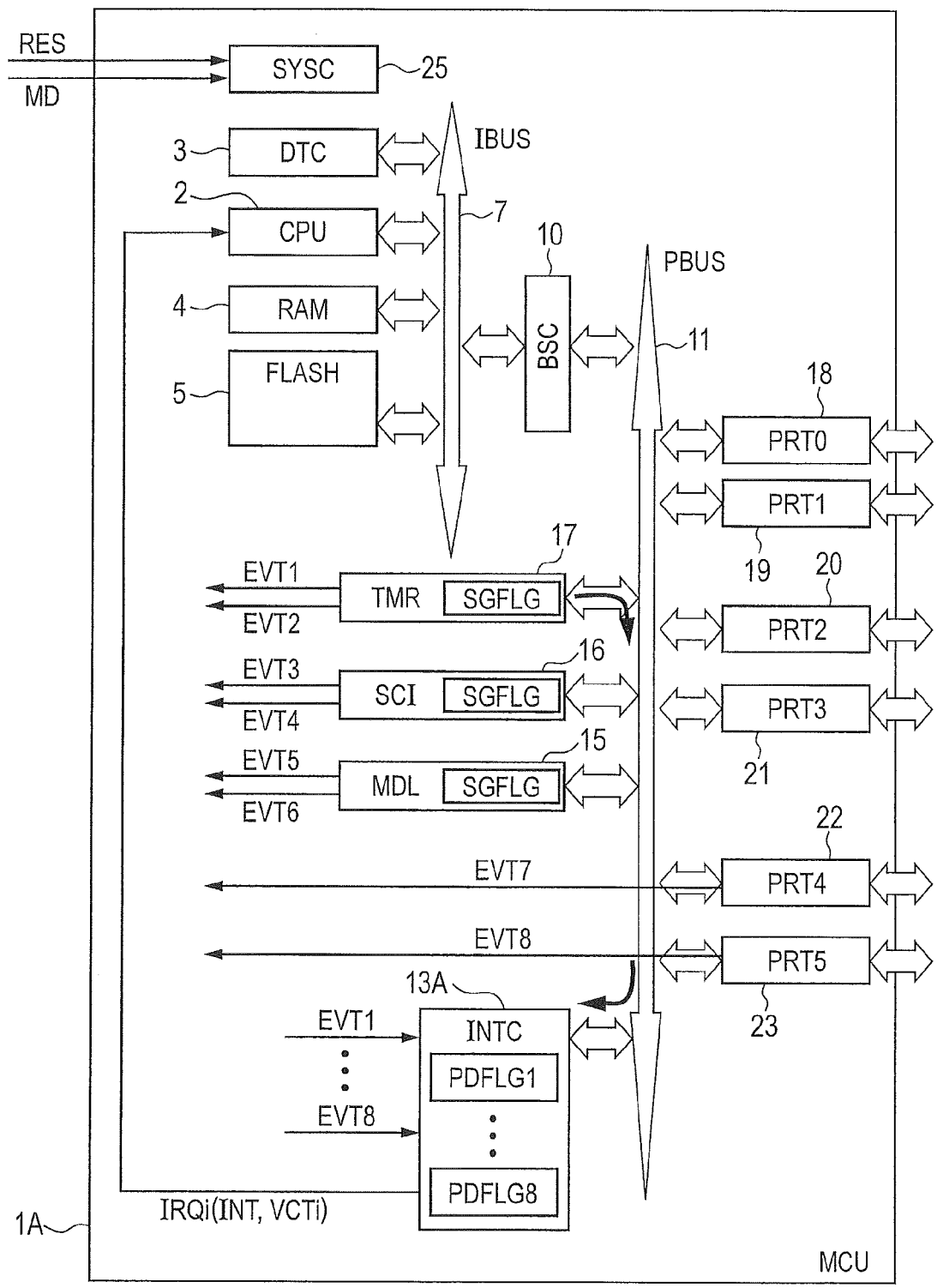
FIG. 10 is a block diagram illustrating a microcomputer as a data processing apparatus according to a second embodiment.
Figure 11:
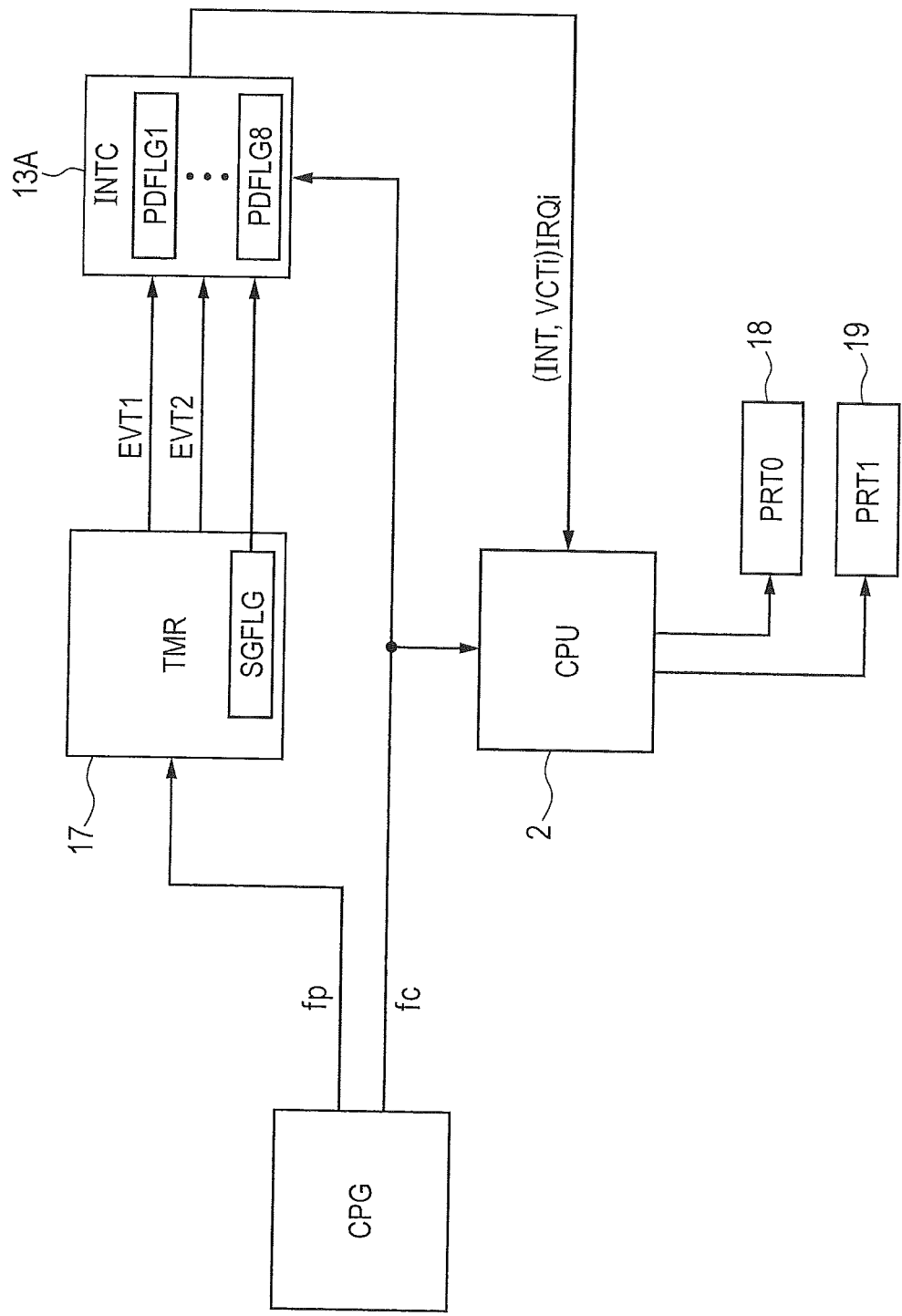
FIG. 11 is a block diagram typically illustrating a main circuit portion related to interrupt processing operation attributable to the event signals generated from a timer at the same time according to the second embodiment.

FIG. 10 illustrates a microcomputer 1A as a data processing apparatus according to a second embodiment. FIG. 11 typically illustrates a main circuit portion related to interrupt processing operation attributable to the event signals EVT1 and EVT2 generated from the TMR 17 at the same time. Differences from the first embodiment will be described below. That is, when receiving the event signal that can be generated at the same time, and is lower in the interrupt priority level, the interrupt controller 13A refers to the concurrent flag SGFLG before generating the interrupt request. If the referred concurrent flag SGFLG is in the set state, the interrupt controller 13A refers to the request flag of the concurrent event signal, and issues the interrupt request in the interrupt priority order to the concurrent event signals under control. The interrupt controller 13A clears the concurrent flag SGFLG after referring to the concurrent flag SGFLG. The processing request flag PDFLGi is cleared by the CPU 2 with the execution completion of the interrupt processing as in the first embodiment. Heavy arrows in FIG. 10 schematically denote reference paths of the concurrent flag SGFLG and the processing request flags PDFLG1 to PDFLG8. The other configurations are identical with those in the first embodiment, and therefore a detailed description thereof will be omitted.

For example, referring to FIG. 11, when receiving the event signal EVT2 that can be generated at the same time, and is lower in the priority, the interrupt controller 13A refers to the concurrent flag SGFLG of the TMR 17. If the concurrent flag SGFLG is referred to, and set in the set state, the interrupt controller 13A further refers the processing request flag PDFLG1 corresponding to the event signal EVT1 that can be generated at the same time, and is higher in the interrupt priority level. The interrupt controller 13A determines whether the interrupt processing corresponding to the event signal EVT1, which is generated at the same time, and higher in the interrupt priority, has been completed, or not, on the basis of the referred processing request flag. If the determination result is the completion, the interrupt controller 13A conducts the interrupt request IRQ2 corresponding to the current event signal EVT2, which is lower in the priority, on the CPU 2.

If the determination result is not the completion, the interrupt controller 13A defers the issuance of the interrupt request IRQ2 corresponding to the event signal EVT2 lower in the priority, and issues the interrupt request IRQ1 corresponding to the concurrent event signal EVT1 higher in the interrupt priority than the event signal EVT2 ahead. The vector VCT1 included in the interrupt request to be issued ahead may be specified in association with the processing request flag PDFLH1 that has been already referred to.

A case in which the number of concurrent event signals is three or more is the same as the case of two concurrent event signals. In short, if the event signal other than the event signal highest in the interrupt priority among those event signals is generated, the interrupt controller 13A refers to the concurrent flag SGFLG of the request source, and refers to the request flag of the concurrent event signals pertaining to the event signal if the concurrent flag SGFLG is set. The interrupt controller 13A determines whether the interrupt processing corresponding to the event signal which is generated at the same time and is highest in the priority request has been executed, or not, with the use of the referred results, and issues the interrupt request for execution of that interrupt processing if not executed. If the interrupt processing of the highest priority has been executed, or is executed, the interrupt controller 13A determines whether the corresponding interrupt processing has been executed, or not, under the condition in which the concurrent event signal which is second highest in the priority is not the current interrupt signal. If the interrupt processing has not been executed, the interrupt controller 13A issues the interrupt request for execution of that interrupt processing. If the interrupt processing has been executed, or is executed, the interrupt controller 13A may issue the interrupt request corresponding to the current event signal to the CPU. If the concurrent event signal which is next highest in the priority is the current event signal, the interrupt controller 13A may issue the interrupt request corresponding to the current event signal to the CPU 2.

The concurrent flag SGFLG referred to in the above processing is cleared by the interrupt controller 13A after the reference processing. Also, the request flag corresponding to the event signals that have been subjected to the interrupt processing before the current interrupt processing in the interrupt priority order in the above sequence of processing is cleared by the CPU 2 when the interrupt processing has been completely executed.

According to the second embodiment, even if the concurrent event signals have been sequentially received by the interrupt controller 13A due to the wiring delay or the crosstalk delay, the interrupt controller 13A that has received the processing request corresponding to the event signal can determine whether those event signals have been generated at the same time, or not, with reference to the concurrent flag SGFLG of the circuit module pertaining to the requested interrupt factor. The event signals generated from the different circuit modules at the same time by chance, and the event signals generated from the same circuit module at different timings can be surely distinguished from each other. The interrupt controller 13A requests the interrupt processing corresponding to the concurrent event signals in order of priority, for example, with reference to the processing request flag pertaining to the reception of the event signals, when the interrupt controller 13A determines that there is a processing request corresponding to the concurrent event signal. Therefore, the high reliability can be ensured for the processing order corresponding to the event signals generated from one circuit module at the same time to be set to the order of priority, and its realization is also facilitated.

Third Embodiment

Figure 12:
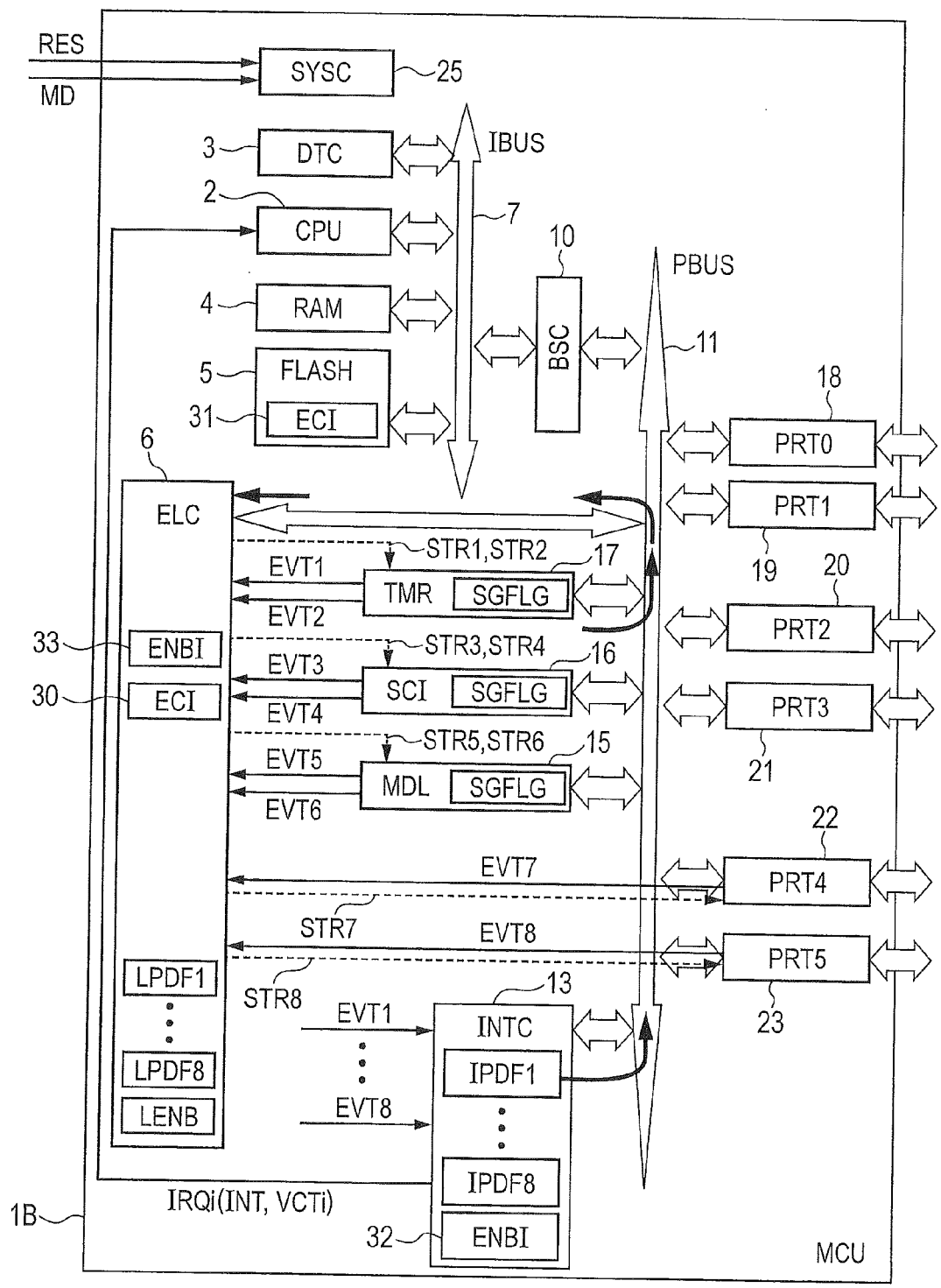
FIG. 12 is a block diagram illustrating a microcomputer as a data processing apparatus according to a third embodiment.

FIG. 12 illustrates a microcomputer 1B as a data processing apparatus according to a third embodiment. A difference from the first embodiment resides in that an event link controller (ELC) 6 is added.

The event link controller 6 is supplied with the event signals EVT1 to EVT8 typically shown, as with the interrupt controller 13. The event link controller 6 holds event control information ECI that defines a correspondence between the event signals EVT1 to EVT8 and the start control signals STR1 to STR8 in a register 30. When the event link controller 6 is supplied with an event signal EVTi, the event link controller 6 outputs a start control signal STRi corresponding to the event signal EVTi according to the event control information ECI. A source of the event signal EVTi and a destination of the start control signal STRi may be the same circuit module, or different circuit modules, and its correspondence is defined by the event control information ECI. In particular, although not shown, the interrupt controller 13 can output the event signals to the event link controller 6 according to an operating state thereof. Circuits that output the event signal EVTi or receive the start control signal STRi can be also generally called "circuit modules" for convenience.

The flash memory 5 has a memory area 31 that rewritably holds the event control information ECI, and the event control information ECI is loaded into the register 30 of the event link controller 6 from the memory area 31. For example, the CPU 2 transfers the event control information ECI from the memory area 31 to the register 30 by reset exception processing for initialization. Thereafter, the CPU 2 can rewrite the event control information ECI. Since the memory area 31 is rewritable, required event control information ECI can be easily set according to the configuration of the system to which the microcomputer 1 is applied.

The interrupt controller 13 has an event enable register that holds information ENBI for determining validity or invalidity of the input event signals, and the event link controller 6 has an event enable register 33 that holds information ENBE for determining validity or invalidity of the input event signals. Both of the registers 32 and 33 are initialized by reset processing, and thereafter can be changed in setting by the CPU 2 in a privilege mode although not particularly limited. As a result, the control can be conducted so that the interrupt control by the interrupt controller 13 or the start control of the circuit module by the event link controller 6 is alternatively conducted by one event signal EVT, or both of those controls are conducted in parallel. It is needless to say that the interrupt control by the interrupt controller 13 or the start control of the circuit module by the event link controller 6 can be prevented from competing against each other by the same even signal.

In the third embodiment, the priority control pertaining to the concurrent event signals is conducted by the event link controller 6 in addition to the CPU 2. When the interrupt controller 13 can operate by setting the register 32, the CPU 2 conducts the above priority control as in the first embodiment. When the event link controller 6 can operate by setting the register 33, the event link controller 6 conducts the above priority control. Hereinafter, the priority control for the concurrent event signals by the event link controller 6 will be described.

The event link controller 6 has processing request flags LPDF1 to LPDF8 showing that the processing request is received for each of the event signals EVT1 to EVT8, and links to the corresponding event control information are defined. For example, upon receiving the activated event signals EVT1 and EVT2, the event link controller 6 sets the corresponding processing request flags PLDF1 and PLDF2 in synchronization with the operating clock. The event link controller 6 can determine the respective start priorities on the basis of the event control information linked to the set processing request flag. The processing request flags LPDF1 to LPDF8 set in the set state are cleared by allowing the circuit module that receives the start request to complete the processing. For example, the circuit module that receives the start control signal clears the corresponding processing request flag in a no-request state after the completion of the operation by the start control signal.

When the event link controller 6 receives the event signal that can be generated at the same time, and is lower in the start priority, the event link controller 6 refers the concurrent flag SGFLG before outputting the start control signal. The event link controller 6 conducts a control for outputting the start control signal in the start priority order in response to the concurrent event signals with reference to the request flag of the concurrent event signals if the referred concurrent flag SGFLG is in the set state. The event link controller 6 clears the concurrent flag SGFLG after referring to the concurrent flag SGFLG. Heavy arrows in FIG. 12 schematically denote reference paths of the concurrent flag SGFLG and the processing request flags PDFLG1 to PDFLG8. The other configurations are identical with those in the first embodiment, and therefore a detailed description thereof will be omitted.

Figure 13:
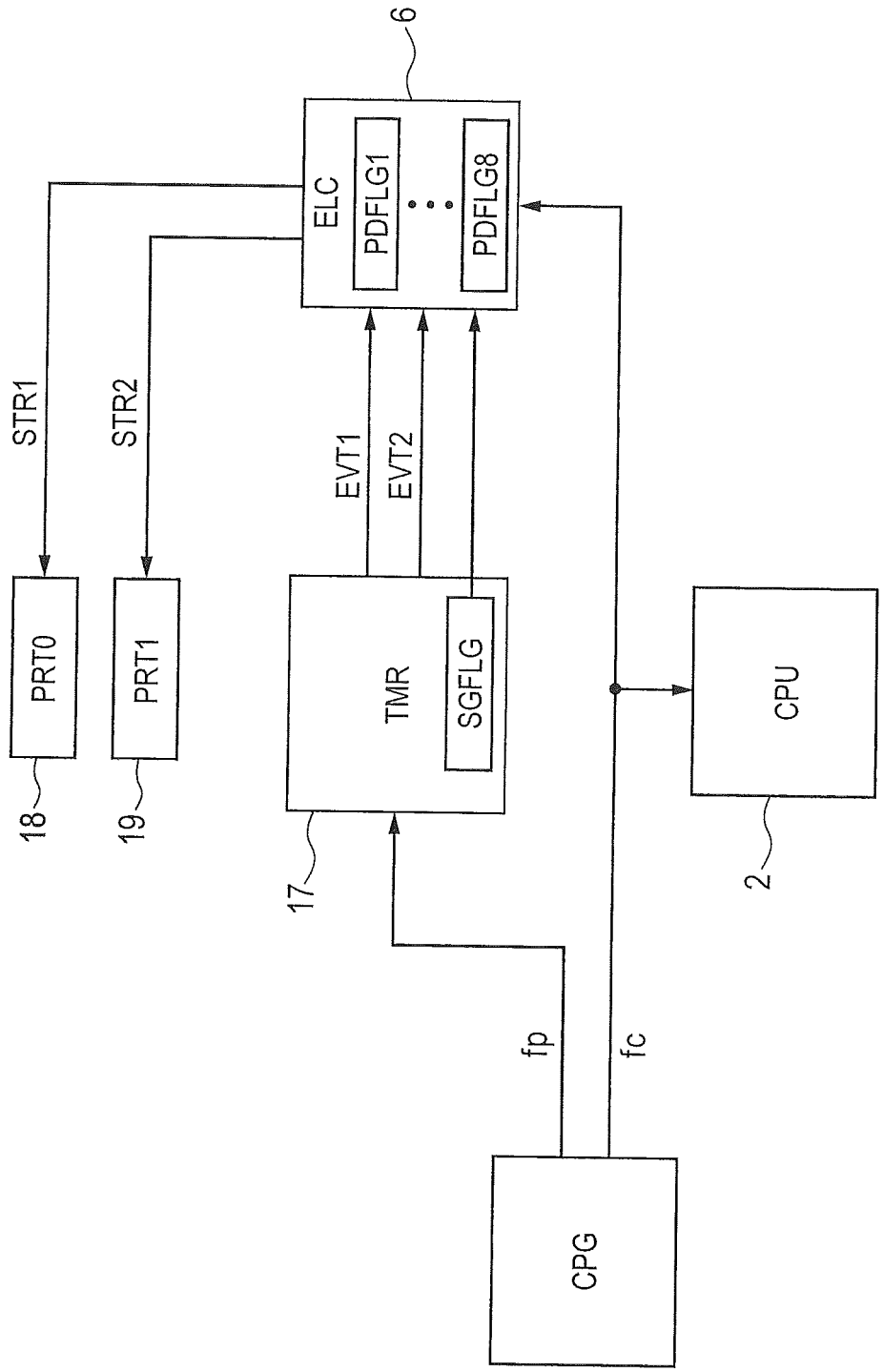
FIG. 13 is a block diagram typically illustrating a main circuit portion related to operation of a start control by an event link controller responsive to the event signals generated from the timer at the same time.

FIG. 13 typically illustrates a main circuit portion related to operation of a start control by the event link controller 6 responsive to the event signals EVT1 and EVT2 generated from the TMR 17 at the same time.

For example, referring to FIG. 13, when the event link controller 6 receives the event signal EVT2 that can be generated at the same time, and is low in the start priority, the event link controller 6 refers to the concurrent flag SGFLG of the TMR 17. When referring to the concurrent flag SGFLG, if the concurrent flag SGFLG is in the set state, the event link controller 6 further refers to the processing request flag LPDF1 corresponding to the event signal EVT1 that can be generated at the same time, and is higher in the start priority. The event link controller 6 determines whether the processing that starts in response to the concurrent event signal EVT1 higher in the start priority is completed, or not, on the basis of the referred processing request flag. If the determination result is the completion, the event link controller 6 outputs the start control signal corresponding to the current event signal EVT2 which is lower in the start priority to a target circuit module.

If the determination result is not the completion, the event link controller 6 defers the issuance of the start control signal corresponding to the event signal EVT2 lower in the priority, and outputs the start control signal corresponding to the event signal EVT1 higher in the start priority than the event signal EVT2 ahead. The event link controller 6 may specify an output destination of the start control signal to be output ahead, with reference to the event control information ECI linked to the corresponding processing request flag. A case in which the number of concurrent event signals is three or more is the same as the case of two concurrent event signals.

According to the third embodiment, even if the concurrent event signals have been sequentially received by the event link controller 6 due to the wiring delay or the crosstalk delay, the event link controller 6 that has received the start request corresponding to the event signal can determine whether those event signals have been generated at the same time, or not, with reference to the concurrent flag of the circuit module pertaining to the requested start factor. The event signals generated from the different circuit modules at the same time by chance, and the event signals generated from the same circuit module at different timings can be surely distinguished from each other. The event link controller 6 requests the start processing corresponding to the concurrent event signals in order of priority, for example, with reference to the processing request flag PDFLGi pertaining to the reception of the event signals, when the event link controller 6 determines that there is a start request corresponding to the concurrent event signal. Therefore, the high reliability can be ensured for the processing order corresponding to the event signals generated from one circuit module at the same time to be set to the order of priority, and its realization is also facilitated.

The present invention is not limited to the above embodiments, but can be variously changed without departing from the spirit of the invention.

The priority control for the concurrent event signals is conducted by the program of the CPU 2 in the first embodiment, and conducted by the hardware or sequencer of the interrupt controller 13A and the event link controller 6. The use of the hardware or sequencer does not mean that the overall priority control is configured by local gates. The priority control can be realized with the use of software such as a microprogram or a nanoprogram.

The priority control for the concurrent event signals is not limited to the above embodiments, but another controller such as a DMA controller or a communication controller may assume a partial function of the priority control.

In the third embodiment, the priority control for the concurrent event signals may be conducted by only the event link controller 6. Also, the event link controller that does not conduct the priority control for the concurrent event signals may be added to the first embodiment or the second embodiment.

The data processing apparatus represented by a microcomputer is not limited to a single chip, but can be configured by a multichip in a system-in-package fashion. The data processing apparatus is not limited to the microcomputer or a microprocessor. The data processing apparatus may be configured by an intelligent semiconductor integrated circuit of the system-on-chip, or a variety of electronic circuits.

What is claimed is:

1. A data processing apparatus, comprising:
a plurality of circuit modules that can generate event signals; and
a controller that controls processing corresponding to the generated event signals when the event signals are generated from the circuit modules,
wherein each of the circuit modules includes a concurrent flag that is set to a set state of a logical high level when generating a plurality of given event signals, different in priority of the processing, at the same time, and otherwise set to logical low level, and
wherein the controller refers to the concurrent flag of the circuit module of a request source when the circuit module generates the given event signals, and controls processing corresponding to a given event signal and processing corresponding to another event signal generated together with the given event signal to be set in order of priority when the concurrent flag is in the set state of the logical high level.

2. The data processing apparatus according to claim 1, wherein when an event signal lower in priority among the plurality of event signals, the controller determines whether the concurrent event signals are generated, or not, with reference to the concurrent flag.

3. The data processing apparatus according to claim 1, wherein when the controller determines that the event signals are generated at a same time, processing corresponding to the concurrent event signals is executed in order of priority, or requests for ordering or starting the processing are issued in order of priority, and
wherein the controller determines which is the processing corresponding to the concurrent event signals with reference to a processing request flag indicating that a processing request has been issued for each of the event signals.

4. A data processing apparatus, comprising:
a central processing unit that executes an instruction;
a plurality of circuit modules that can generate event signals; and
an interrupt controller that receives processing requests corresponding to the event signals generated from the circuit modules, mediates the processing requests that compete the reception according to a processing order corresponding to an interrupt priority, and requests the central processing unit to conduct the interrupt processing corresponding to the received processing request,
wherein the circuit modules each includes a concurrent flag, and changes the concurrent flag from a first state to a second state when generating a plurality of event signals, different in the interrupt priority, at the same time,
wherein, when receiving a request for given interrupt processing from the interrupt controller, the central processing unit refers to the concurrent flag of the circuit module pertaining to an interrupt factor of the request, executes the given interrupt processing corresponding to a given interrupt signal and interrupt processing corresponding to another event signal generated together with the given event signal in order of priority when the concurrent flag is in the second state, and
wherein the central processing unit sets the concurrent flag to the first state after referring to the concurrent flag.

5. The data processing apparatus according to claim 2,
wherein the interrupt controller has a processing request flag indicative of whether the processing request is present, or not, for each of the event signals, and
wherein the central processing unit determines whether the interrupt processing corresponding to the concurrent event signals is unprocessed, or not, with reference to the processing request flag, and clears the corresponding processing request flag in a no-request state after the interrupt processing is completed.

6. The data processing apparatus according to claim 2, wherein the interrupt controller can inhibit multiple interrupt.

7. The data processing apparatus according to claim 2, wherein the circuit modules and the interrupt controller operate in synchronization with different clock signals.

8. The data processing apparatus according to claim 2, wherein the interrupt controller requests the interrupt processing by the interrupt signal and interrupt factor information responsive to the event signal.

9. A data processing apparatus, comprising:
a central processing unit that executes an instruction;
a plurality of circuit modules that can generate event signals; and
an interrupt controller that receives processing requests corresponding to the event signals generated from the circuit modules, mediates the processing requests that compete the reception according to a processing order corresponding to an interrupt priority, and requests the central processing unit to conduct the interrupt processing corresponding to the received processing request,
wherein the circuit modules each includes a concurrent flag, and changes the concurrent flag from a first state to a second state when generating a plurality of event signals, different in the interrupt priority, at the same time, wherein, when receiving a processing request corresponding to a given event signal from the circuit module, the interrupt controller refers to the concurrent flag of the circuit module pertaining to a requested processing factor, requests interrupt processing corresponding to the given processing request, and interrupt processing corresponding to a processing request pertaining to another event signal generated together with the given event signal in order of priority, and wherein the interrupt controller sets the concurrent flag to the first state after referring to the concurrent flag.

10. The data processing apparatus according to claim 9, wherein the interrupt controller has a processing request flag indicative of whether the processing request is present, or not, for each of the event signals, wherein the interrupt controller determines whether the interrupt processing corresponding to the concurrent event signals is unprocessed, or not, with reference to the processing request flag, and wherein the central processing unit clears the corresponding processing request flag in a no-request state after the interrupt processing is completed.

11. The data processing apparatus according to claim 9, wherein the interrupt controller can inhibit multiple interrupt.

12. The data processing apparatus according to claim 9, wherein the circuit modules and the interrupt controller operate in synchronization with different clock signals.

13. The data processing apparatus according to claim 9, wherein the interrupt controller requests the interrupt processing by the interrupt signal and interrupt factor information responsive to the event signal.

14. A data processing apparatus, comprising:

a central processing unit that executes an instruction;

a plurality of circuit modules that can generate event signals; and an event link controller that receives the event signals generated from the circuit modules, mediates the event signals that compete the reception according to a processing order corresponding to a start priority, and can output a start control signal of operation to the circuit modules according to the received event signals, wherein the circuit modules each includes a concurrent flag, and changes the concurrent flag from a first state to a second state when generating a plurality of event signals, different in the start priority, at the same time, wherein the event link controller has a rewritable storage circuit, and the storage circuit is used for storage of event control information for specifying a start control signal to be output in response to the event signals, wherein, when receiving a processing request responsive to a given event signal from the circuit modules, the event link controller refers to the concurrent flag of the circuit modules pertaining to a requested processing factor, and executes an output of the start control signal responsive to the given processing request, and an output of the start control signal responsive to a processing request pertaining to another event signal generated together with the given event signal in order of priority when the concurrent flag is in the second state, and wherein the event link controller sets the concurrent flag to the first state after referring to the concurrent flag.

15. The data processing apparatus according to claim 14, wherein the event link controller has a processing request flag indicative of whether the processing request is present, or not, for each of the event signals, wherein the event link controller determines whether the output of the start control signal corresponding to the concurrent event signals is not output, or not, and wherein the circuit modules that receive the start control signal clears the corresponding processing request flag in a no-request state after the operation responsive to the start control signal is completed.

16. The data processing apparatus according to claim 14, wherein the circuit modules and the event link controller operate in synchronization with different clock signals.

17. The data processing apparatus according to claim 14, wherein the event control information variably designates a correspondence of the event signals and the circuit modules, and variably designates selectable operation in the circuit modules.

18. A data processing apparatus, comprising:

a central processing unit that executes an instruction;

a plurality of circuit modules that can generate event signals; and a controller that receives the event signals generated from the circuit modules, mediates processing corresponding to the event signals that compete the reception according to a processing order corresponding to a priority, and requests a required circuit module to conduct the processing corresponding to the received event signal, wherein the circuit modules each includes a concurrent flag, and changes the concurrent flag from a first state to a second state when generating a plurality of event signals, different in the priority of the processing, at the same time, wherein, when receiving a request for processing corresponding to a given event signal from the circuit modules, the controller refers to the concurrent flag of the circuit module pertaining to a request source thereof, and requests the processing corresponding to the given event signal, and processing corresponding to another event signal generated together with the given event signal in order of priority when the concurrent flag is in the second state, and wherein the controller sets the concurrent flag to the first state after referring to the concurrent flag.

19. The data processing apparatus according to claim 18, wherein the controller has a processing request flag indicative of whether the processing request is present, or not, for each of the event signals, wherein the controller determines whether the processing requested in response to the concurrent event signals is not processed, or not, with reference to the processing request flag, and wherein the circuit modules that is required to conduct the processing in response to the event signal clears the corresponding processing request flag in a no-request state after the requested processing is completed.

20. The data processing apparatus according to claim 18, wherein the circuit modules and the controller operate in synchronization with different clock signals.

* * * * *